US010038957B2

(12) United States Patent
Laaksonen et al.

(10) Patent No.: US 10,038,957 B2
(45) Date of Patent: Jul. 31, 2018

(54) AUDIO MIXING BASED UPON PLAYING DEVICE LOCATION

(71) Applicant: Nokia Corporation, Espoo (FI)

(72) Inventors: Lasse Juhani Laaksonen, Nokia (FI); Olli Ali-Yrkko, Kangasala (FI); Jari Hagqvist, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 71 days.

(21) Appl. No.: 13/847,158

(22) Filed: Mar. 19, 2013

(65) Prior Publication Data

US 2014/0285312 A1 Sep. 25, 2014

(51) Int. Cl.

*H04B 1/20* (2006.01)
*H04R 5/02* (2006.01)
*H04R 3/12* (2006.01)
*H04S 7/00* (2006.01)

(52) U.S. Cl.

CPC ................. *H04R 5/02* (2013.01); *H04R 3/12* (2013.01); *H04S 7/302* (2013.01); *H04R 2420/07* (2013.01); *H04R 2499/11* (2013.01)

(58) Field of Classification Search

CPC ........ H04R 5/02; H04R 3/12; H04R 2420/07; H04R 2499/11; H04S 7/302
See application file for complete search history.

(56) References Cited

U.S. PATENT DOCUMENTS 5,715,318 A * 2/1998 Hill .......................... H04S 7/40 381/17
6,782,238 B2 * 8/2004 Burg ...................... G09B 5/065 434/1
8,068,105 B1 * 11/2011 Classen ......................... 345/440
8,396,576 B2 * 3/2013 Kraemer et al. ................ 700/94
8,923,995 B2 * 12/2014 Lindahl .................. G06F 3/167 700/94
2003/0081115 A1 * 5/2003 Curry ...................... H04M 3/56 348/14.12
2004/0184619 A1 * 9/2004 Inagaki .................... H04R 5/04 381/77
2005/0141724 A1 * 6/2005 Hesdahl .......................... 381/58
2005/0179701 A1 8/2005 Jahnke .......................... 345/619
2007/0101249 A1 * 5/2007 Lee .......................... H04S 7/30 715/203
2007/0223751 A1 9/2007 Dickins et al. ............... 381/310
2007/0253558 A1 11/2007 Song et al. ...................... 381/56
2008/0046910 A1 * 2/2008 Schultz ................ G10H 1/0008 725/12
2008/0207115 A1 * 8/2008 Lee ..................... H04M 1/7253 455/3.06
2008/0278635 A1 * 11/2008 Hardacker ......... H04N 5/44582 348/734
2009/0068943 A1 3/2009 Grandinetti et al. ........ 455/3.06
2010/0119072 A1 5/2010 Ojanpera ........................ 381/17
2010/0223552 A1 9/2010 Metcalf ......................... 715/716

(Continued)

OTHER PUBLICATIONS

Pachet, et al. "MusicSpace goes Audio;" In Roads, C., editor, Sound in Space, Santa Barbara, 2000. Create (3 pages).

(Continued)

*Primary Examiner* — Quang D Pham
(74) *Attorney, Agent, or Firm* — Harrington & Smith

(57) ABSTRACT

A method including determining location of at least one second device relative to a first device, where at least two of the devices are configured to play audio sounds based upon audio signals; and mixing at least two of the audio signals based, at least partially, upon the determined location(s).

17 Claims, 12 Drawing Sheets

(56) References Cited

U.S. PATENT DOCUMENTS

| | | | | |
|---|---|---|---|---|
| 2012/0093348 | A1* | 4/2012 | Li | H04S 3/002 381/300 |
| 2012/0254382 | A1* | 10/2012 | Watson | H04W 4/21 709/221 |
| 2012/0294446 | A1* | 11/2012 | Visser | H04S 1/007 381/17 |
| 2013/0114819 | A1* | 5/2013 | Melchior et al. | 381/59 |
| 2013/0236040 | A1* | 9/2013 | Crawford | H04S 7/304 381/310 |
| 2014/0086414 | A1* | 3/2014 | Vilermo | H04S 3/008 381/17 |
| 2014/0146970 | A1* | 5/2014 | Kim | H04R 5/00 381/17 |
| 2014/0146984 | A1* | 5/2014 | Kim | H04R 5/00 381/307 |
| 2014/0247945 | A1* | 9/2014 | Ramo | H04S 3/008 381/17 |
| 2015/0078556 | A1* | 3/2015 | Shenoy | H04S 7/302 381/56 |
| 2015/0098571 | A1* | 4/2015 | Jarvinen | H04S 7/301 381/1 |
| 2015/0319530 | A1* | 11/2015 | Virolainen | H04N 7/15 381/303 |

OTHER PUBLICATIONS

Pertila, et al. "Acoustic Source Localization in a Room Environment and at Moderate Distances," Tampereen Tenkillinen Yliopisto Tampere University of Technology, Publication 794, 2009, (136 pages).

* cited by examiner

AUDIO MIXING BASED UPON PLAYING DEVICE LOCATION

BACKGROUND

Technical Field

The exemplary and non-limiting embodiments relate generally to audio mixing and, more particularly, to user control of audio processing, editing and mixing.

Brief Description of Prior Developments

It is known to record a stereo audio signal on a medium such as a hard drive by recording each channel of the stereo signal using a separate microphone. The stereo signal may be later used to generate a stereo sound using a configuration of loudspeakers, or a pair of headphones. Object-based audio is also known.

SUMMARY

The following summary is merely intended to be exemplary. The summary is not intended to limit the scope of the claims.

In accordance with one aspect, an example method includes determining location of at least one second device relative to a first device, where at least two of the devices are configured to play audio sounds based upon audio signals; and mixing at least two the audio signals based, least partially, upon the determined location(s).

In accordance with another aspect, a non-transitory program storage device readable by a machine is provided, tangibly embodying a program of instructions executable by the machine for performing operations, the operations comprising determining location of at least one second device relative to a first device, where at least two of the devices are configured to play respective audio sounds, where the respective audio sounds are at least partially different, where each of the respective audio sounds are generated based upon audio signals; and mixing the audio signals based, at least partially, upon location of the at least one second device relative to the first device.

In accordance with another aspect, an example apparatus comprises electronic components including a processor and a memory comprising software, where the electronic components are configured to mix audio signals based, at least partially, upon location of at least one device relative to the apparatus and/or at least one other device, where at least two of the apparatus and the at least one device are adapted to play respective audio sounds, where the respective audio sounds are based upon audio signals, where the apparatus is configured to adjust mixing of the audio signals based upon location of the at least one device relative to the apparatus and/or the at least one other device.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
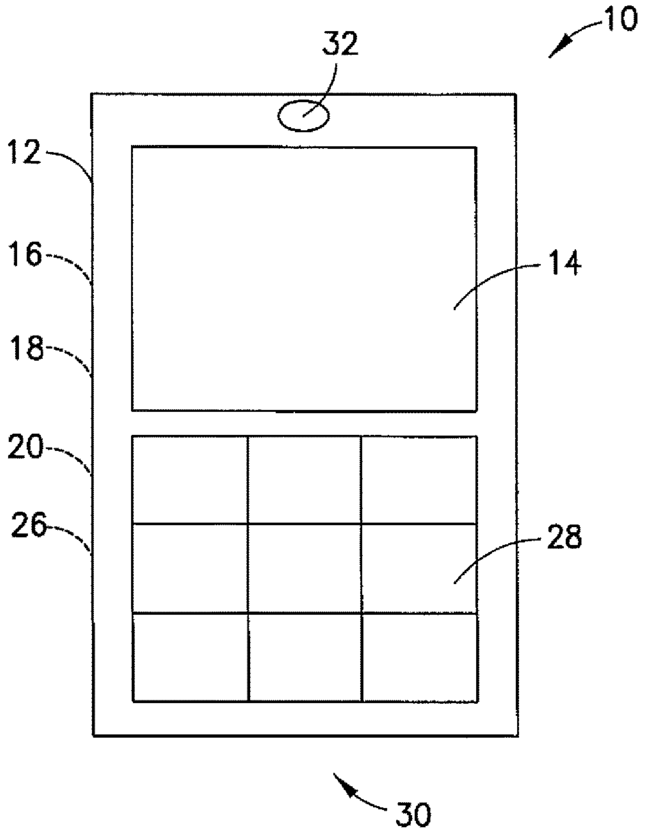
FIG. 1 is a front view of an example embodiment.

Referring to FIG. 1, there is shown a front view of an apparatus 10 incorporating features of an example embodiment. Although the features will be described with reference to the example embodiments shown in the drawings, it should be understood that features can be embodies in many alternate forms of embodiments. In addition, any suitable size, shape or type of elements or materials could be used.

The apparatus 10 may be a hand-held communications device which includes a telephone application. The apparatus 10 may also comprise an Internet browser application, camera application, video recorder application, music player and recorder application, email application, navigation application, gaming application, and/or any other suitable electronic device application. Referring to both FIGS. 1 and 2, the apparatus 10, in this example embodiment, comprises a housing 12, a display 14, a receiver 16, a transmitter 18, a rechargeable battery 26, and a controller 20 which can include at least one processor 22, at least one memory 24 and software. However, all of these features are not necessary to implement the features described below.

The display 14 in this example may be a touch screen display which functions as both a display screen and as a user input. However, features described herein may be used in a display which does not have a touch, user input feature. The user interface may also include a keypad 28. However, the keypad might not be provided if a touch screen is used. The electronic circuitry inside the housing 12 may comprise a printed wiring board (PWB) having components such as the controller 20 thereon. The circuitry may include a sound transducer 30 provided as a microphone and one or more sound transducers 32 provided as a speaker and earpiece.

Figure 2:
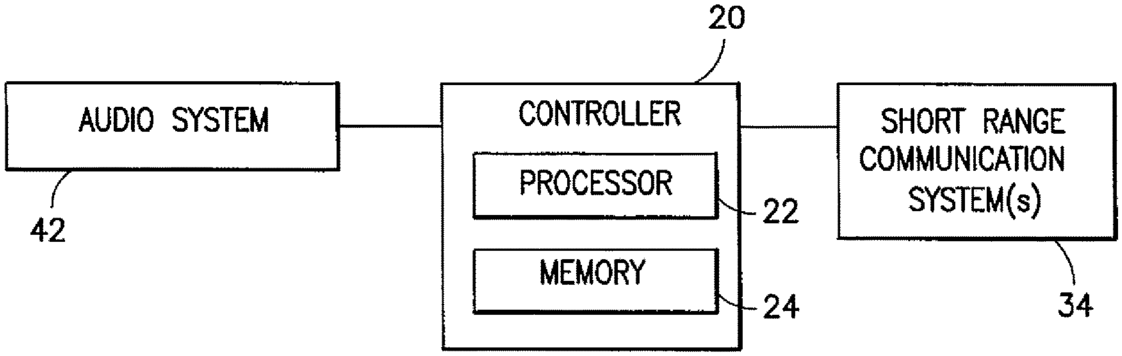
FIG. 2 is a block diagram illustrating components of apparatus shown in FIG. 1.

The receiver 16 and transmitter 18 form a primary communications system to allow the apparatus 10 to communicate with a wireless telephone system, such as a mobile telephone base station for example. As shown in FIG. 2, in addition to the primary communications system 16, 18, the apparatus 10 also comprises a short range communications system 34. This short range communications system 34 comprises an antenna, a transmitter and a receiver for wireless radio frequency communications. The range may be, for example, only about 30 feet (10 meters) or less. However, the range might be as much as 60 feet (20 meters) for example.

Figure 3:
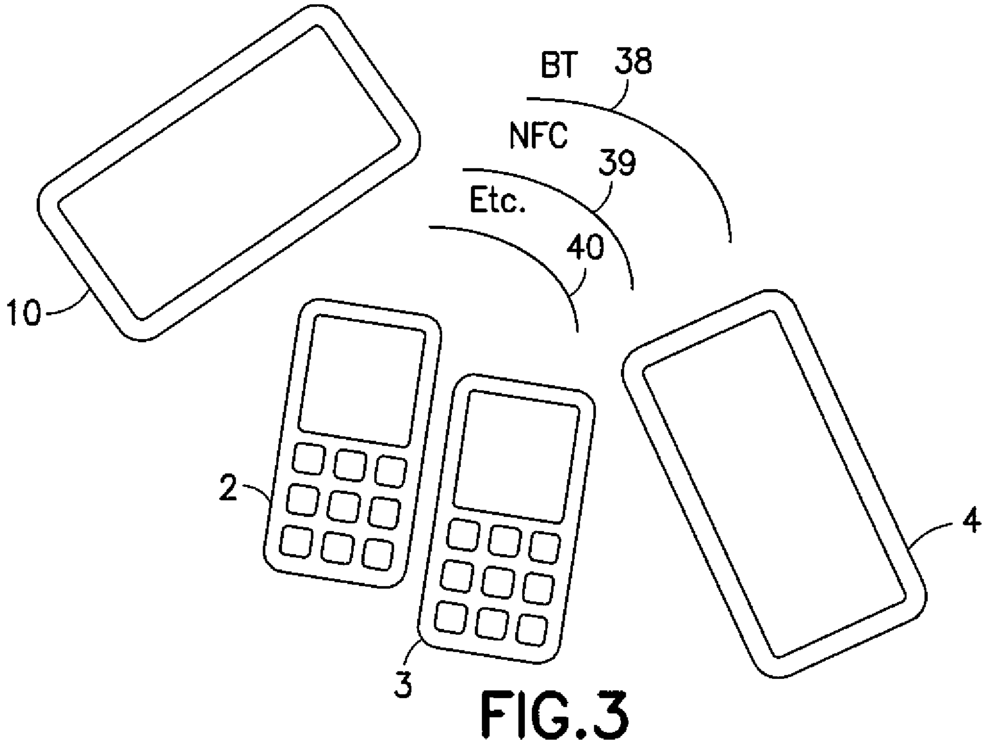
FIG. 3 is an illustration of wireless connection of multiple devices.

The short range communications system 34 may use short-wavelength radio transmissions in the ISM band, such as from 2400-2480 MHz for example, creating personal area networks (PANs) with high levels of security. This may be a BLUETOOTH communications system for example. The short range communications system 34 may be used, for example, to connect the apparatus 10 to another device, such as an accessory headset, a mouse, a keyboard, a display, an automobile radio system, or any other suitable device. An example is shown in FIG. 3 where the apparatus 10 is shown being connected to other devices 2, 3, 4 by example BLUETOOTH (BT) and Near Field Communication (NFC) links 38, 39 or any other suitable link as exemplified by Etc. 40.

As seen in FIG. 2, the apparatus 10 also comprises an audio system 42 for playing sound, such as music for example. The audio system 42 may comprise, for example, the speaker 32 and other electronic components including the controller 20 for example. In an alternate example the apparatus 10 might not comprise an audio system for playing sound.

Figure 4:
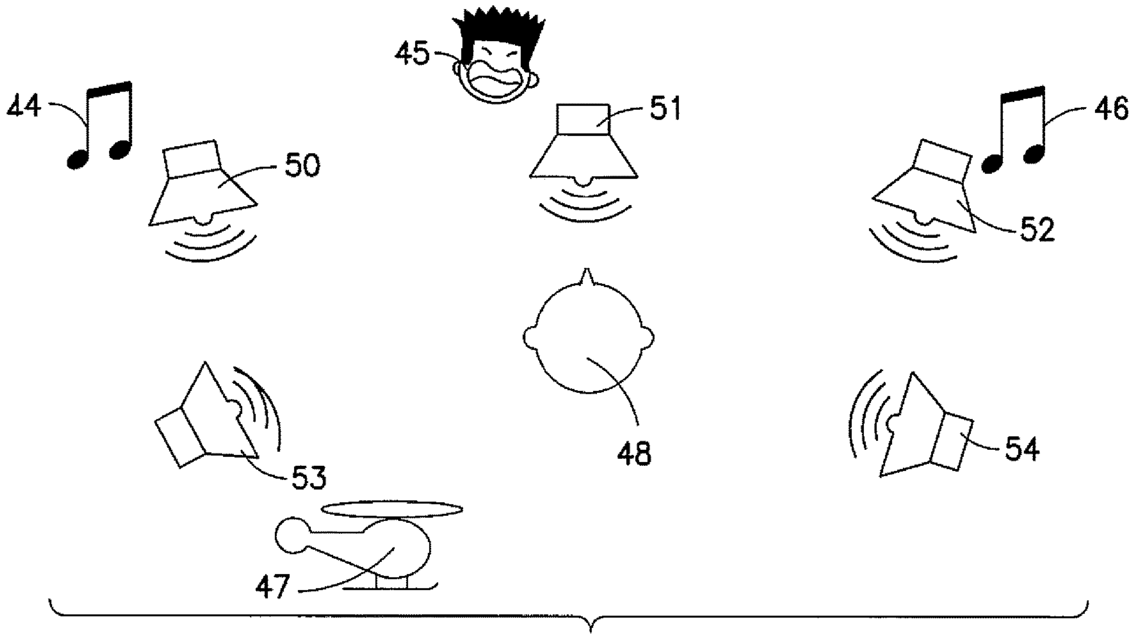
FIGS. 4-5 are illustrations of a set of object based signals.

FIG. 4 presents rendering the locations of a set of object-based audio signals. In particular, FIG. 4 illustrates a set of object-based audio signals in terms of rendering their locations in a sound reproducing system (such as a home theater for example). Each of these audio objects 44-47 defines a spatial locations in the audio scene, based on which the necessary processing is performed to render the sound such that it appears from the correct direction to a listener 48 given a set of channels/speakers 50-54 in the rendering system. Thus, a single mix of object-based audio can make it possible to render the overall audio scene correctly regardless of issues such as varying speaker setups, etc.

There are various ways to define the spatial location for the audio objects. For example, one can record a real audio scene, analyze the objects in the scene and use the location information obtained from this analysis. As another example, one can generate a sound effect track for a movie scene, where one defines the spatial locations in the editing software. This is effectively the same approach as panning audio components (for example, a music track, a sound of an explosion, and a person speaking) for a pre-defined speaker setup. Instead of panning the audio between channels, the locations are defined.

Figure 5:
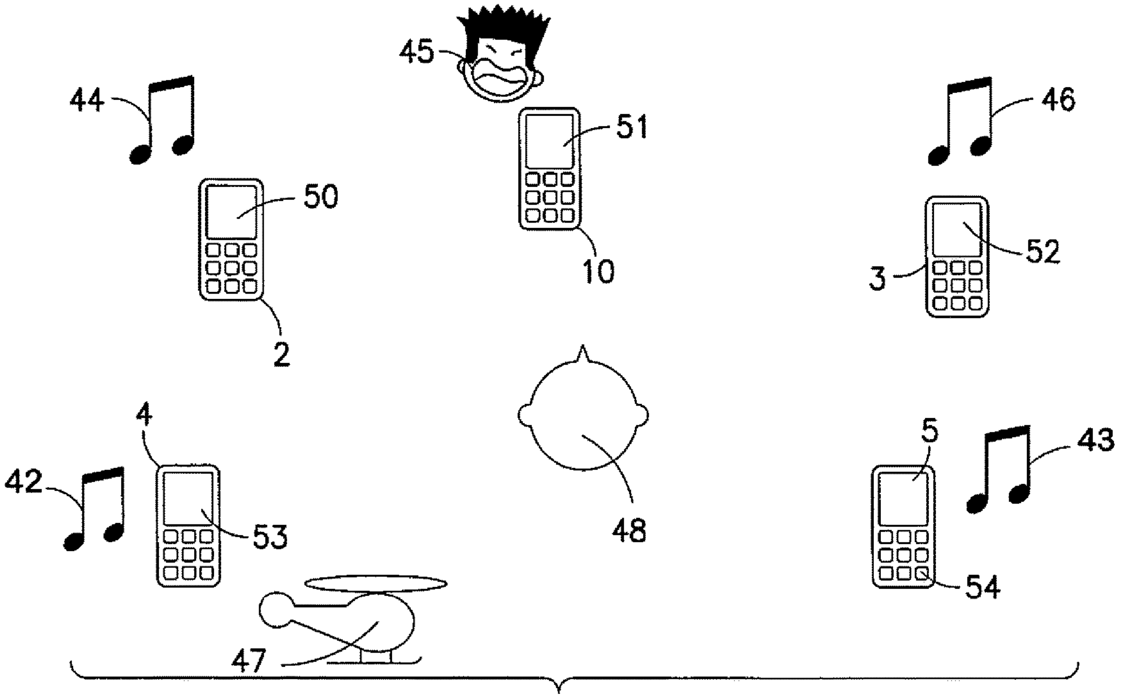

Features as described herein may be used with a user control of audio processing, editing and mixing. Features as described herein may be used with object-based audio in general and, more specifically, the creation and editing of the spatial location of an audio object. Referring also to FIG. 5, in this example the audio objects 42-47 may be played by the apparatus 10 and four other devices 2-5 as the set of channels/speakers 50-54 respectively.

Object-based audio can have properties such as the spatial location in addition to the audio signal waveform. Defining the locations of the audio objects is generally a difficult problem outside such applications where purely post-productional editing can be done (such as mixing audio soundtrack for a movie for example). Even in those cases, more straightforward and intuitive ways to control the mixing would be desirable. It seems the field is especially lacking solutions that provide new ways to create and modify audio objects as well as solutions that provide shared, social experiences for the users.

Known device locating technologies, indoor positioning systems (IPS), etc. can be utilized to support features as described herein. Technologies such as BLUETOOTH and NFC (Near Field Communication) can be utilized in pairing/group creation of multiple devices and data transfer between them as illustrated by FIG. 3.

There are various ways to define the spatial location of audio objects. Alternatives include analysis of the objects in a recorded scene and manual editing (for example for a movie soundtrack). Automatic extraction of audio objects during recording relies on source-separation algorithms that may introduce errors. Manual editing is always a good alternative to produce a baseline for further work or to finalize a piece of work. However, manual editing lacks in terms of being a shared, social experience. Further, limitations of a single mobile device in terms of screen size and resolution as well as input devices are apparent. It seems useful to consider how multiple devices can be utilized to improve the efficiency and to even create new experiences.

Features as described herein may be used to create or modify the locations of object-based audio components based on the relative positions of multiple devices. In addition, positions of accessories or other objects whose position can be detected can be utilized in this process. In particular, the relative location of an object-based audio sample or event may be given by the location of a device that plays or otherwise represents the said sound.

Unlike U.S. patent publication number 2010/0119072 which described a system for recording and generating a multichannel signal (typically in the form of a stereo signal) by utilizing a set of devices that share the same space, features as described herein may provide a novel way to remix existing audio tracks into a spatial representation (as separate audio objects) by utilizing multiple devices that share the same space. With features as described herein, the relative locations of the devices may be used to create the user interface where “input” is the location of a device, and where “output” is the experienced sound emitted from the “input” location in relation to the reference location (such as 48 in FIGS. 4-5 for example).

A difference between U.S. patent publication number 2010/0119072 and features as described herein is that the former relates to recording new material while the latter relates to creating new mixes of existing recordings. Thus, the scope and the description differ in several modules and details of the overall systems. Features as described herein present novel ways to achieve editing and mixing of existing audio tracks and samples in 3D space. Features as described herein may utilize the recording aspects described in U.S. patent application Ser. No. 13/588,373 in which is hereby incorporated by reference in its entirety, but these are not a mandatory step for using features as described herein. In a system comprising features as described herein, accessories that lack a recording capability can be utilized to offer more user control in the mixing process. It is preferred that these accessories have playback support, but even that is not mandatory. The only requisite is that the overall system can detect their location and track a change in location. It is assumed that the same localization and data transfer technologies can be used both in the system of U.S. patent application Ser. No. 13/588,373 and the current invention.

Figure 6:
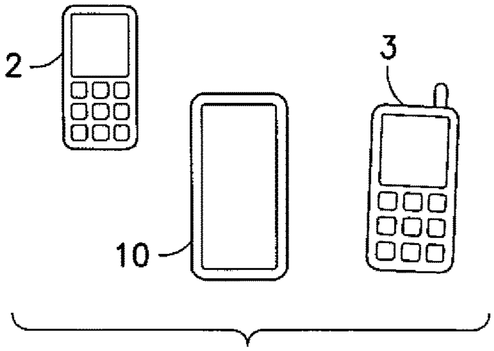
FIG. 6-10 are illustrations showing control of audio objects by relative position of devices.
Figure 7:
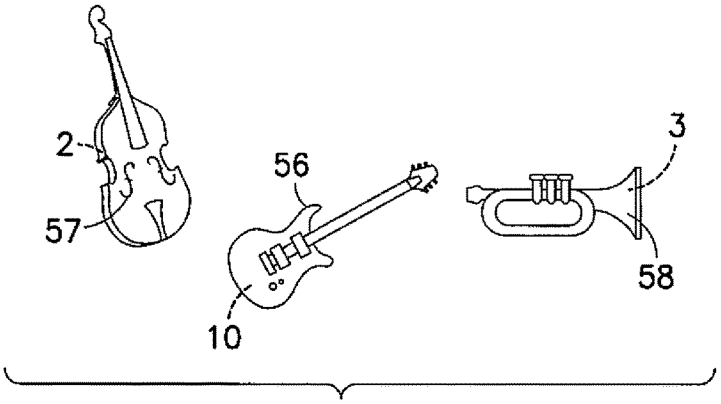
Figure 8:
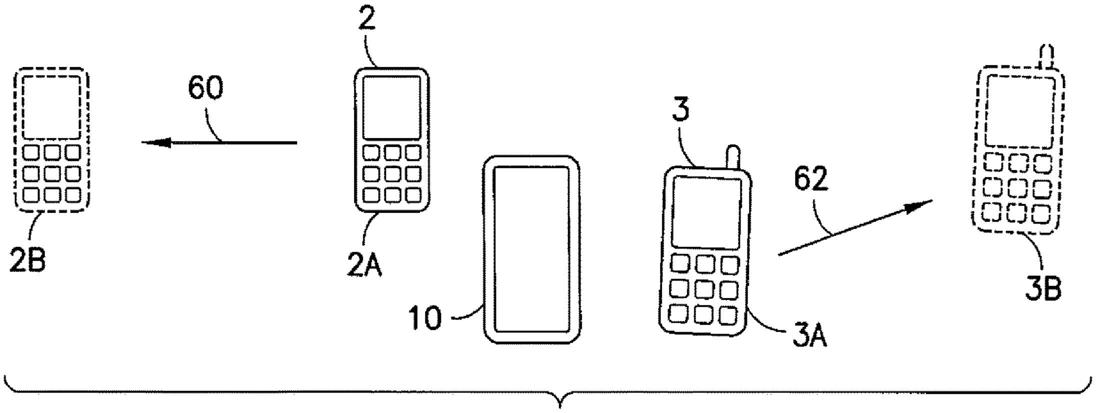
Figure 9:
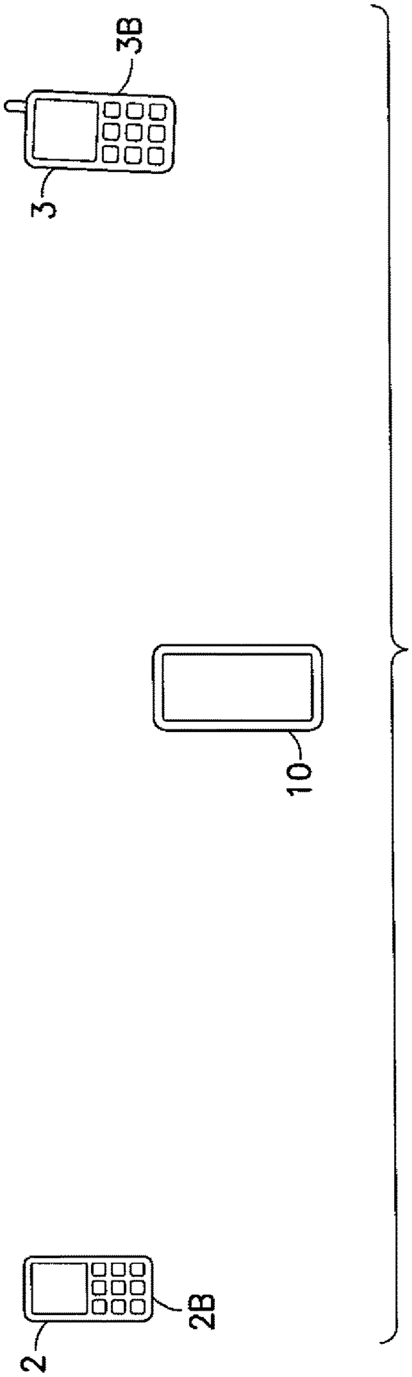
Figure 10:
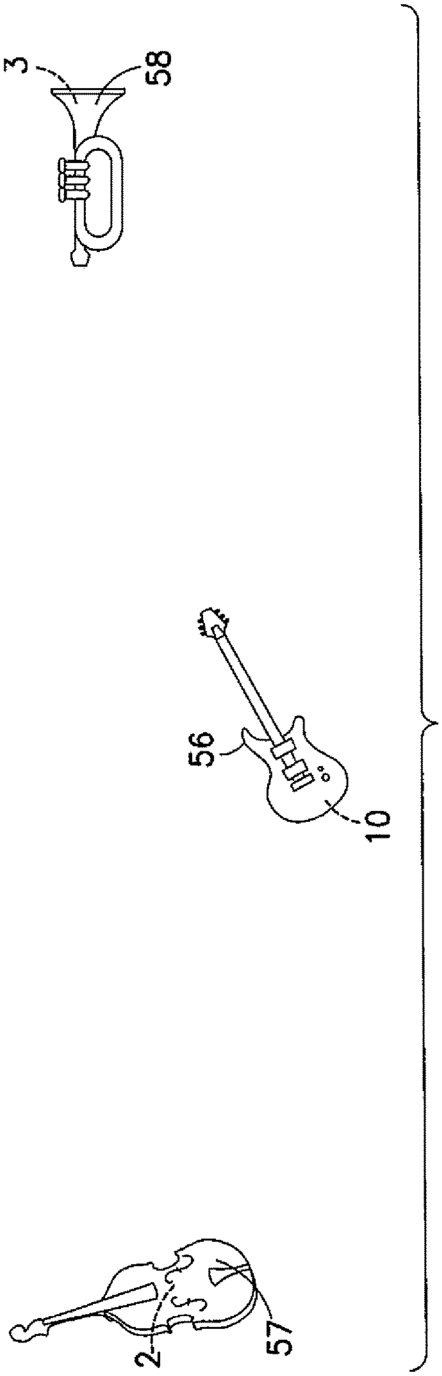

Referring also to FIG. 6, the apparatus 10 is shown which has been linked to the two devices 2, 3 via the short range communication system(s) 34. Referring also to FIG. 7, the apparatus 10 and two devices 2, 3 may be used to play the audio objects 56, 57, 58 comprising sounds of a guitar, base and trumpet, respectively. Referring also to FIG. 8, the two devices 2, 3 are shown being moved as illustrated by arrows 60, 62 from their first locations 2A, 3A relative to the apparatus 10 shown in FIG. 6 to new second locations 2B, 3B, as subsequently illustrated by FIG. 9. This relocation of the devices 2, 3 relative to the apparatus 10 results in a change in the audio scene as illustrated in comparing FIG. 7 to FIG. 10. More particularly, the audio scene now has the sound of the audio objects 57, 58 more spaced apart from the sound of the audio object 56 of the apparatus 10.

Figure 11:
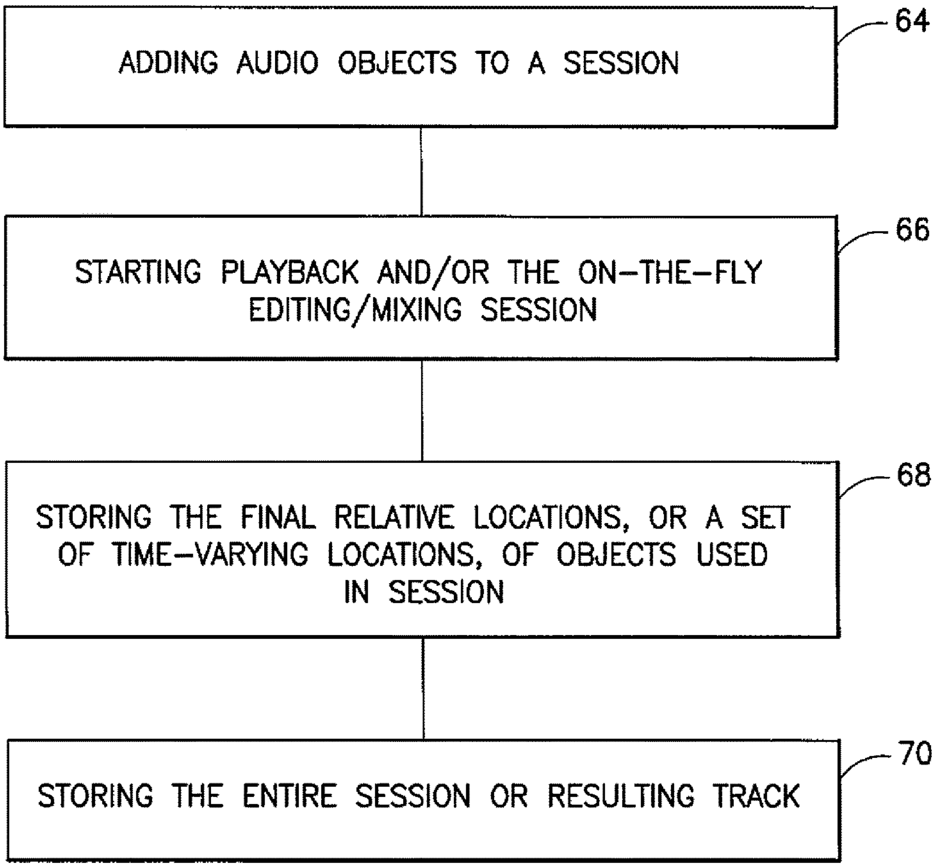
FIG. 11 is a diagram illustrating steps of an example method.

Features as described herein allow mixing of audio signals based upon location of the apparatus/devices relative to each other. In one example as illustrated by FIG. 11, the multi-device controlled mixing of the object-based audio may include the following steps:

Adding audio objects to a session as illustrated by block 64. This may include authentication and/or identification of the devices, and this may include downloading and/or uploading of audio objects/tracks/samples.

Starting playback and/or the on-the-fly editing/mixing session as illustrated by block 66. Playback may be restarted during the session. Block 64 may be repeated for at least one new device during the session. This may include a synchronization of the devices such that on command all devices will start playback at the same time. The editing/mixing can also be done silently. There is no requirement of audible playback from the devices. In this context, the starting of playback can refer to synchronizing the audio samples on each device.

Storing the final relative locations, or a set of time-varying locations, of objects used in session as illustrated by block 68. This may include additional control information (e.g., sound level). This may include additional audio effects (e.g., reverberation).

Storing the entire session or resulting track (including the audio objects and their newly created spatial location information) on at least one of the participating devices, a server, or a service as indicated by block 70. The state of some audio objects may be saved during the session rather than waiting till the end of the session, since a physical device may take the role of more than one object during the session.

Object-based audio has additional properties to audio signal waveform. An autonomous audio object can have properties such as onset time and duration. It can also have a (time-varying) spatial location give, e.g., by x-y-z coordinates in a Cartesian coordinate system. Audio objects can be processed and coded without reference to other objects, a feature which can be exploited, e.g., in transmission or rendering of audio presentations (musical pieces, movie sound effects, etc.). Of particular interest herein is the creation and mixing of object-based audio presentations.

Features as described herein allow a user to define the spatial locations of the audio objects by controlling, or mixing, the audio scene using multiple devices.

The first use case is to define each object's spatial location only in relation to each other object. The second use case is to define the spatial locations relative to a main device, or the origin, which may also be utilized to access the user interface (UI) of the system.

In the first use case option, one of the devices in the session may be used to control the User Interface (UI). However, it remains unclear where the actual listening position is, since only the locations of the objects in relation to each other are known. In this case, the location may be indicated in the UI at any point during the session. The first option can be considered a special case of the more generic second option.

FIGS. 6-10 illustrate the second use case. The main device 10 in the second use case option may be referred to as the observing device. It can be positioned at the location where the listener or observer sits. This arrangement, thus, gives a direct spatial sensation for the listener. As the devices that play back an audio object are moved around the listening positions, the listener or observer automatically hears each audio object from the real direction. FIGS. 6-10 present controlling the spatial locations of audio objects by relative positions of devices. For example, moving the left-most of the three devices away (to the left) of the main device makes the violin playback associated with that device appear from father away. This is naturally observed "live" as the physical device emitting the sound is moved.

It is understood that one or more of the devices may also be accessories or other devices/physical objects. In preferred embodiments, the devices/physical objects that are used are capable of storing, receiving/transmitting, and playing audio samples (audio objects). However, in some embodiments "dummy" physical objects may be used, e.g., as placholders to aid in the mixing. The lowest-level requirement for a physical object to appear in the system is, thus, that it can be somehow identified and its location can be obtained.

Figure 12:
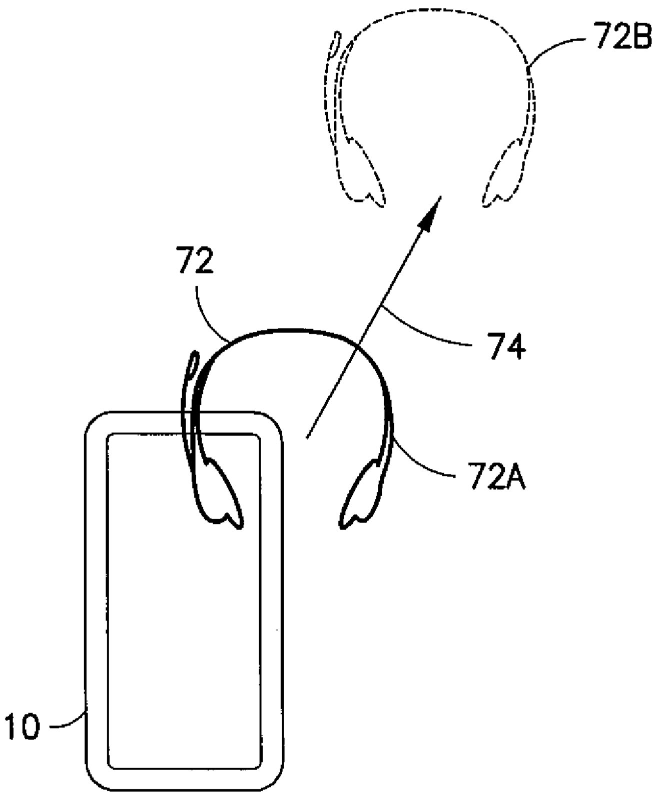
FIG. 12-13 are diagrams illustrating reverberation control using features as described herein.
Figure 13:
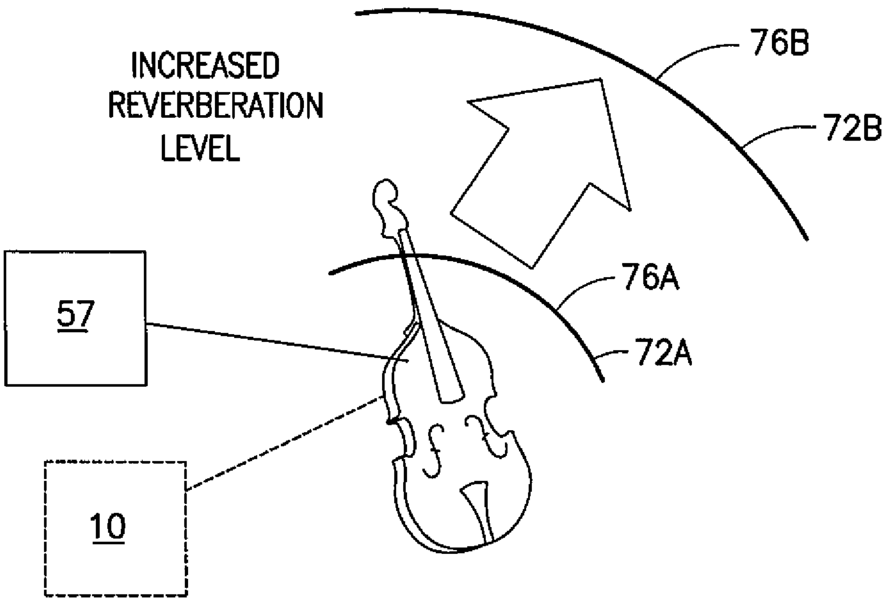

Accessories may also be used to control additional effects referring to an audio object. In particular, FIG. 12 defines a way to control reverberance of an audio object. In this example a headset 72 is provided as an accessory for the device 10. The headset 72 may be moved or relocated relative to the apparatus 10 as indicated by arrow 74 from a first location 72A to a second location 72B. Based upon this change in location, the apparatus 10 may be programmed to control or adjust reverberance of an audio object 57. Referring also to FIG. 13, the reverberation level of the audio object 57 from the apparatus 10 is 76A at the first relative location 72A of the headset 72 relative to the apparatus 10, and is a different level 76B at the second relative locations 72B relative to the apparatus 10. FIGS. 12-13 present using a mobile device accessory to control an audio effect of an audio object, which in turn is controlled by the mobile device itself.

Figure 14:
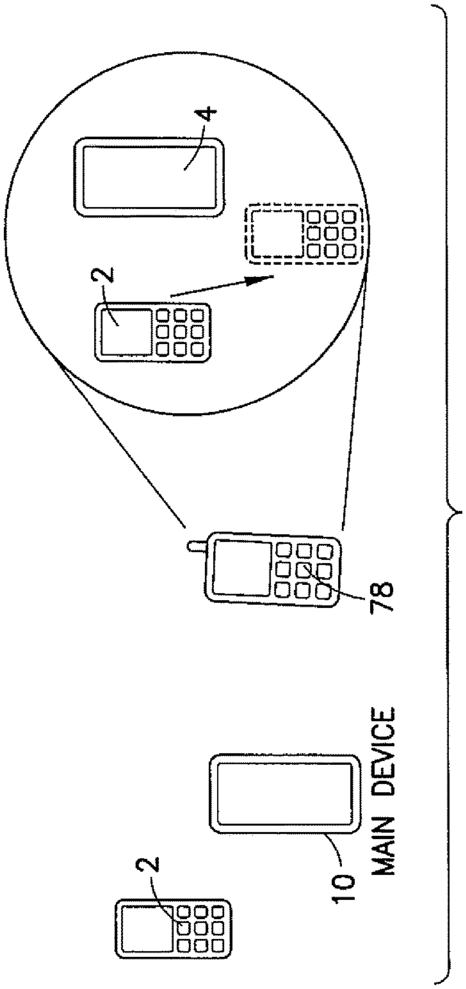
FIGS. 14-15 are diagrams illustrating nesting control scenarios.
Figure 15:
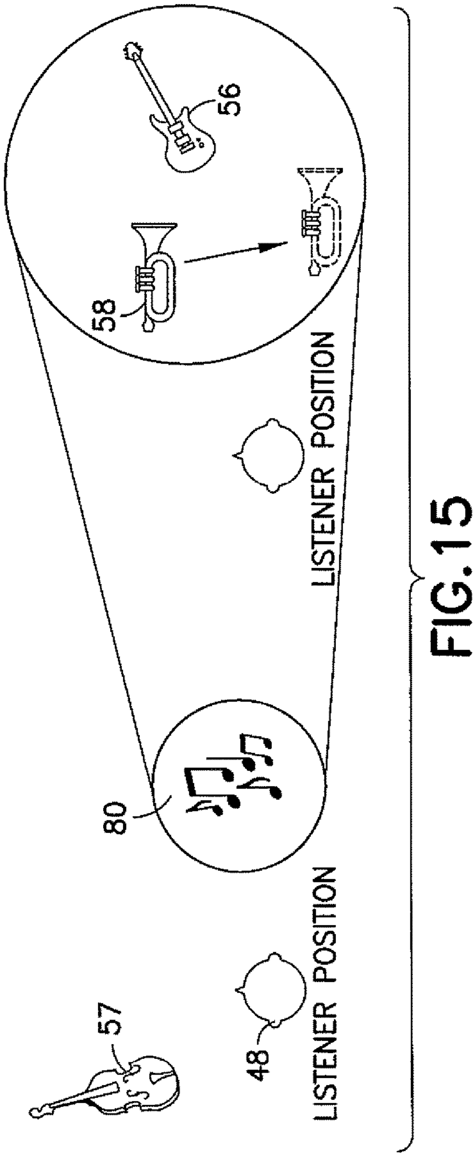

Referring also to FIGS. 14 and 15, mixes may be nested such that an audio object 78 (which is a combined representation of more than one audio object) may be defined by a set 80 of its components 2, 4 that can be controlled separately, either before, during or after the main mixing process. It is understood that additional devices (accessories, etc.) can be used for these separate mixes of audio objects, and that the existing devices can be "re-used" i.e. given another role for the duration of the nested mixing.

In case of utilizing additional effects, controlling the nested mixes, or introducing a new audio object to the session, it may be necessary to resynchronize the devices or objects. This may be done by performing again step 66 above (starting playback etc.) or by synchronizing the new object to one or more of the existing ones (e.g., the main device).

It is understood that existing spatial locations of audio objects in an object-based audio recording or scene may be taken as a starting point for the new mix or edit. Thus, the spatial location of audio objects may be altered in relation to their original locations by moving each device in relation to the origin (which can be, e.g., the location of the main device) and/or locations at which they appear during the start of the process. These "original locations" correspond to the existing spatial locations in the spatial recording.

Figure 16:
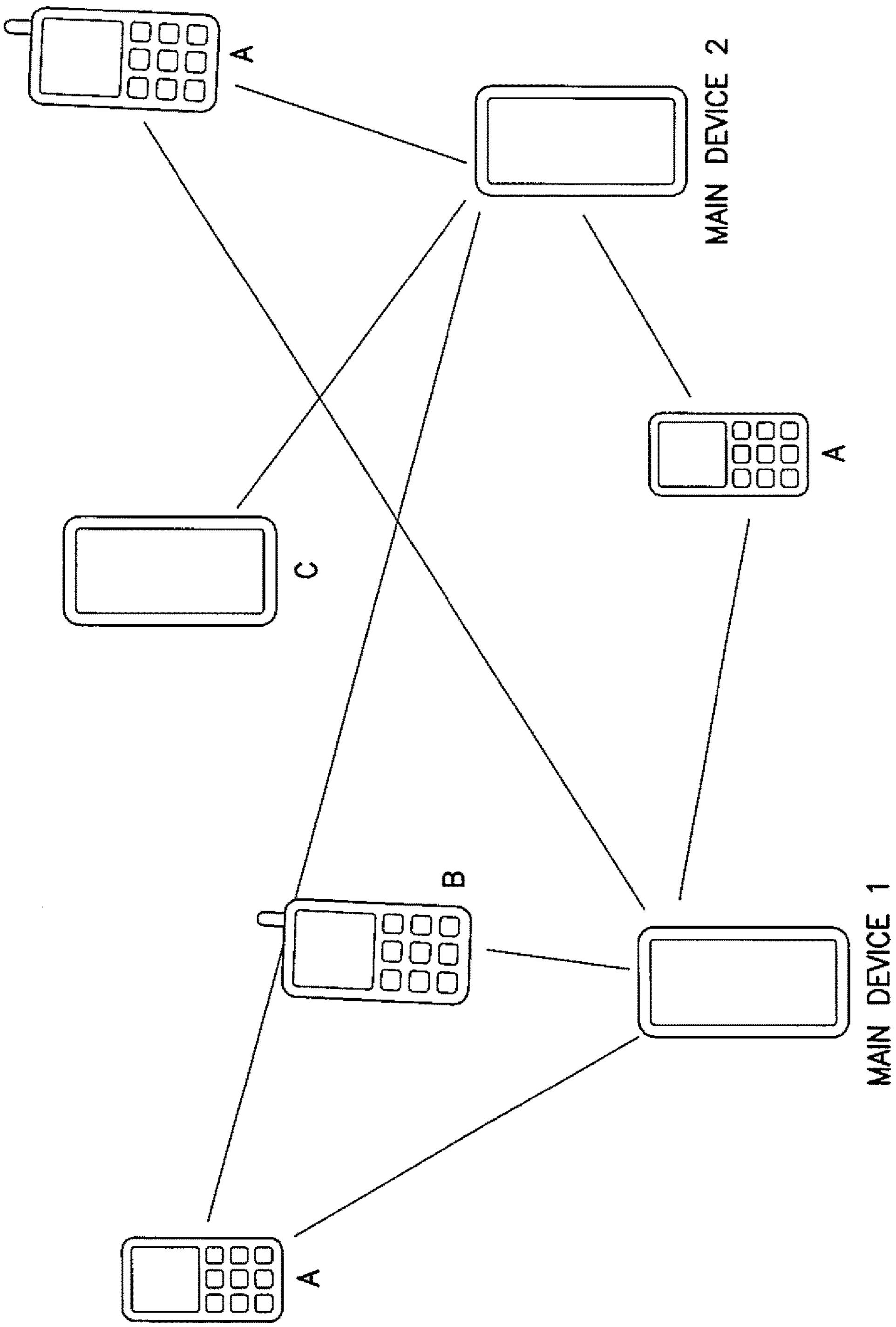
FIG. 16 is a diagram illustrating using more than one main device.

It is further understood that there may be more than one main device or origin, each of which can define a set of spatial locations for the audio objects they are connected to. FIG. 16 illustrates this. This example presents a use case of having more than one main device in the system, each of which can utilize their own subset of audio objects. In this example, set of devices A is seen by both main device 1 and main device 2, device B is seen only by main device 1, and device C is seen only by main device 2. It is understood that such a configuration can be used to independently mix the two channels of a stereo signal or two separate recordings. The playback can be simultaneous (everything heard as once) or switch between the playbacks of each main device (thus e.g. concentrating on playback of a single channel).

Figure 17:
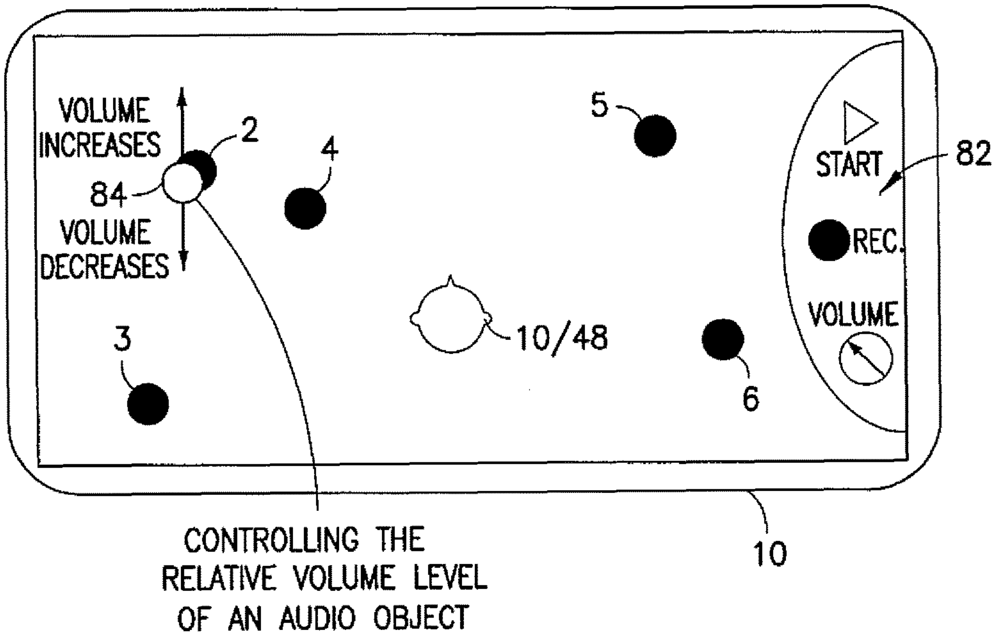
FIGS. 17-18 are diagrams illustrating examples of user interfaces.

FIG. 17 presents an example UI on the display 14 of the apparatus 10. The basic UI feature controls 82 are for (re)starting the playback and controlling the playback levels of the audio objects. A graphical presentation of the audio objects in the space may be provided as illustrated by 2-6 relative to the apparatus/user 10/48. The device screen shown in FIG. 17 features the locations of audio objects 2-6 (in 2 dimensions) relative to the listener position (which may be the main device location). Additional UI features may include "recording" of the material with current (static) locations (i.e. saving the spatial mix), and/or starting recording with time-varying locations. The relative volume of an audio object may be controlled using a scrolling motion on the touch screen as illustrated at 84. The control panel on the right-hand side features overall volume control, a recording/saving button and a 'start' button to restart the playback from the devices.

Figure 18:
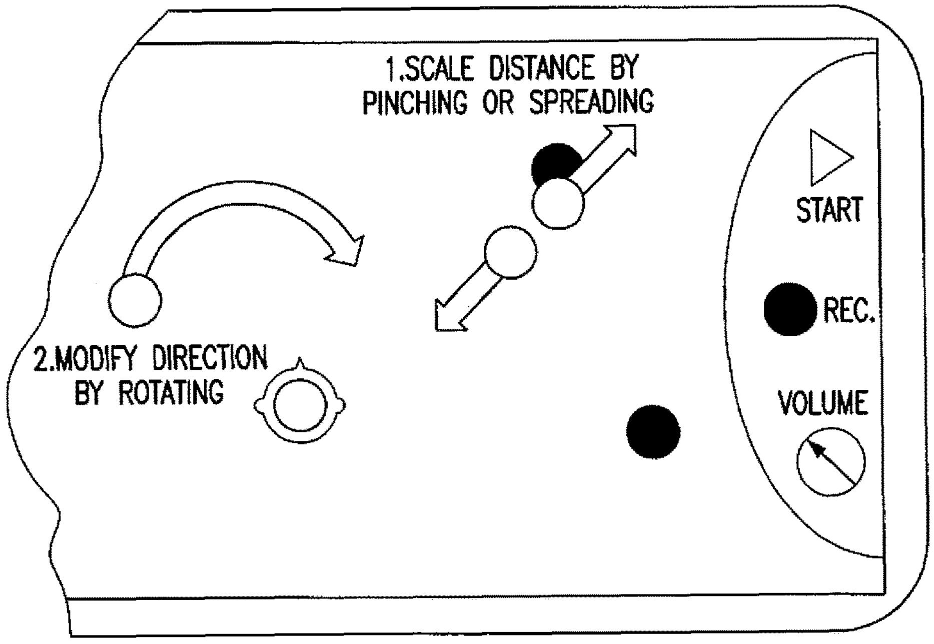

Advanced UI features may allow changing the overall direction of viewing (i.e. redefine what direction is front, etc.), as well scaling of distances either i) uniformly, or ii) relatively. In the former case, all current spatial distances may be multiplied with a uniform gain/scale factor. In the latter case, the gain factor may differ across the object space. These features are illustrated in FIG. 18. Scaling of individual audio object distances (in relation to the listener) and modifying the overall direction may be provided. For example, pinching/spreading on an audio object may affect its distance scaling while pinching/spreading on the listener position may affect the overall distance scaling. Similarly, rotating on an audio object may affect its position (direction) in the rendering while rotating on the listener position may affect the overall directions (i.e. which side is front).

The locations of the devices may be obtained via any suitable process. In particular, an indoor positioning system (IPS) may be utilized to locate the devices. Acoustical positioning techniques may be employed. The acoustical positioning techniques may be based, e.g., on detecting the room response, the audio signals emitted by each device, or even specific audio signals emitted for the purpose of positioning the devices. Multi-microphone spatial capture can be exploited to derive the directions of the devices emitting an audio signal.

One type of example use case may be considered a "it takes a village to mix a piece of music". Let us picture a village in a growth market country, where the mobile phone is a major investment to most people. The people of the village may have a desire to produce music together and share their recording with other people. However, they lack the access to a sufficient number of amplifiers and recording devices as well as computer-aided mixing and editing. What they can accomplish is to perhaps record one instrument onto each mobile device, or to play together and record everyone playing at the same time. After this, they may work on mixing and editing on a mobile device: a task that requires a different set of skills and expertise to playing an instrument, and a task that is not best conventionally suited for mobile devices, especially lower than high-end devices.

A new possibility, provided by the features as described herein, is to record one instrument onto each device as before, and then to create the spatial mixing via playing the instruments from these devices in the same room or space, and controlling the mix via moving/relocating the devices 10, 2-N around the listening position and the UI of the proposed system. Once the users find their preferred levels and positions for the instruments, the object-based track of the session is automatically created (at least in the apparatus 10), and it can be shared for playback for any type of speaker setup, etc.

One type of example use case may be considered a "audio-visual presentation of a party". Attendees of a party can synchronize their devices with their friends and each pick up an audio sample to represent them. Each user who wants to create a spatial soundtrack of their friends' movements can act as a main device. As the device movements are tracked. The created object-based audio scene can be combined, e.g., with videos and photographs from the party to convey how people mingle and to help in identifying interesting moments. For example, as one of a user's friends enters a room, his audio sample may be automatically played from the respective direction.

The invention enables a user friendly and effective method for spatial mixing of audio and individual audio objects. No theoretical understanding or previous experience of the processes or music production is required from the users, as the mixing and editing is very intuitive and the listening during the mixing process is "live". This is further a shared, social experience and, therefore, has further potential for novel applications and services.

Features as described herein provide a new use case for accessories that communicate wirelessly or through a physical connection with an apparatus. Accessories that have a playback capability can directly be used in the mixing. Certain effects can be controlled by accessories that do not have a playback capability, although they cannot provide the direct "live" experience by themselves. They can then either influence the playback of the device they are attached to, or as a fall back the effect can be observed in the "main mix". In this latter case, headphone playback may be used by all participating users or at least the main device user.

Figure 19:
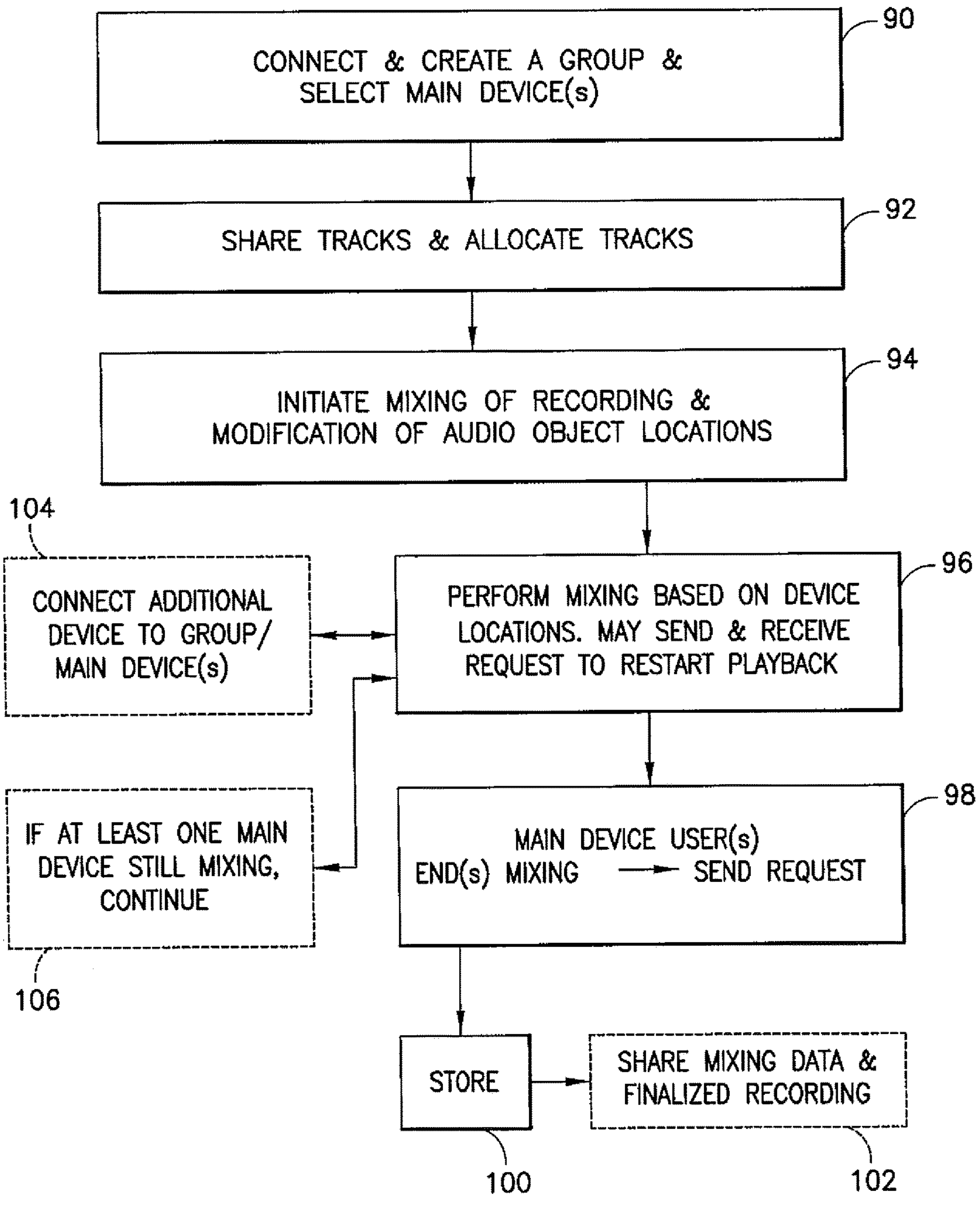
FIG. 19 is a diagram illustrating an example method.

FIG. 19 presents a high-level block diagram of an example mixing process starting from initiation and ending in storing/sharing of the finalized data and recording/mix. The devices 2-N and 10 (where N is a number greater than 2) may connect and create a group as illustrated by block 90 for example using NFC, BT or any other suitable technology. The audio tracks are shared and allocated to each device as illustrated by block 92, or each user can already have their own recording on their device. The device(s) allocated as the main device initiates the actual mixing as illustrated by block 94. As illustrated by block 96, mixing may be performed based on device locations, and may send and receive requests to restart playback. As illustrated by blocks 104 and 106, additional devices may be connected to the group or as a main device, and if at least one main device is still missing, then step 96 may continue. When the mix is finalized (upon user input), the main device sends a request to participating devices to end emitting sound as illustrated by block 98. The finalized data is stored as illustrated by block 100 and may be shared as illustrated by block 102 locally or through an applicable service.

FIG. 19 presents a high-level block diagram of the steps involved in making a location-based mix and edit of the audio objects according to the method of the invention. The explanation follows use case 1 described above. The mix begins when devices are brought to a common location and a group is formed. Typically this can be achieved via BLUETOOTH connectivity or similar methods. At least one main device is also selected. This user controls the mix. Users then proceed to select the audio objects they wish to utilize in their mix. The tracks may be shared across all devices and at least one track is allocated to each participating device. The main device suer initialized the mix. This may start the playback or a separate call to start the playback is done via the main device user interface. Each device can then be moved in the space. Moving the device moves the associated sound (tracks) in relation to the reference position. When the users are happy with their mix, the main device user ends the mixing and a stop request is sent to each device in the group. The resulting data is stored.

Figure 20:
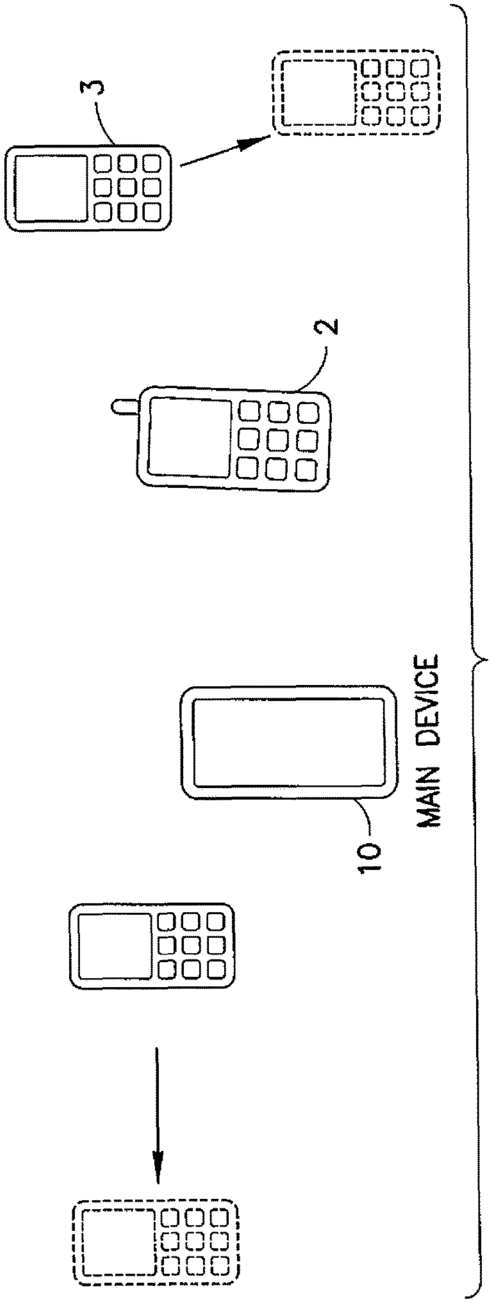
FIGS. 20-21 are diagrams illustrating controlling spatial locations of audio objects by relative positions of devices.
Figure 21:
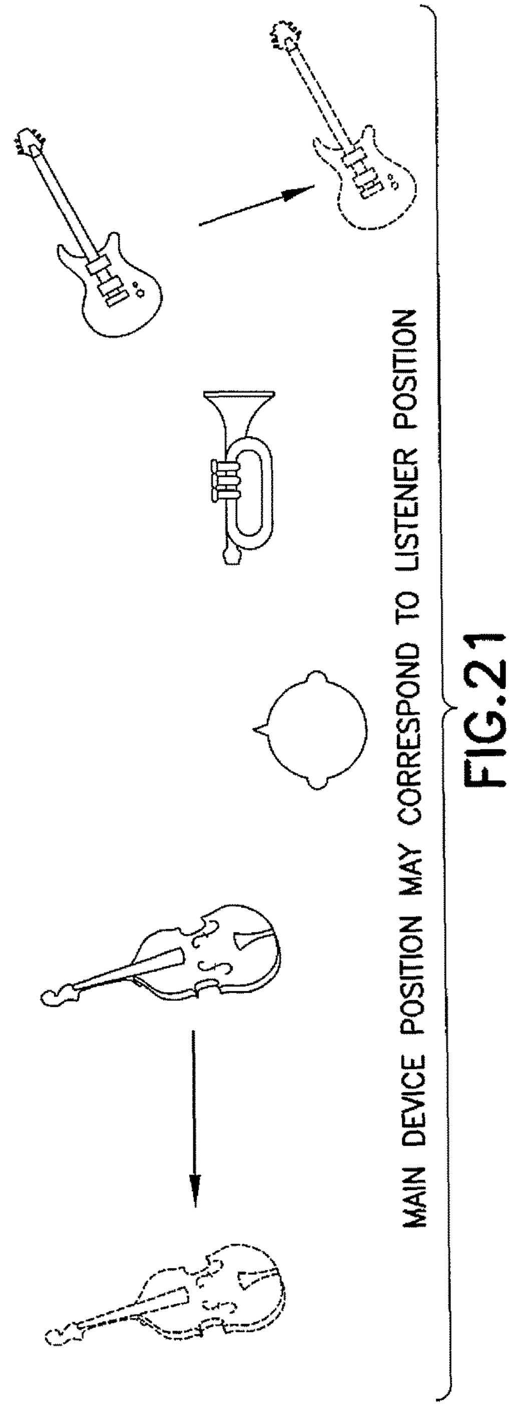

FIGS. 20-21 present controlling the spatial locations of audio objects by relative positions of devices, where at least one of the devices 2 or 10 acts as a main device, or origin of the x-y-z space for another device 3 (even though mixing occurs only in the apparatus/device 10, which may correspond to the listener position for example). This example presents controlling the spatial locations of audio objects by relative positions of devices, where at least one of the devices acts as a main device, or origin of the x-y-z space.

With features as described herein, multiple devices may be utilized as sound sources (energy) whose locations are known in relation to an agreed reference (this reference would typically be the main device or one of them). Possible use cases include social mixing of music (resulting in stereo or spatial tracks) and modification of object-audio vectors (spatial location).

One type of example method comprises playing respective audio sounds on at least two devices, where the respective audio sounds are at least partially different, where each of the respective audio sounds are generated based upon audio signals comprising at least one object based audio signal; moving location at least one second one of the devices relative to a first one of the devices; and mixing the audio signals based, at least partially, upon location of the at least one second device relative to the first device.

One type of example method comprises determining location of at least one second device relative to a first device, where at least two of the devices are configured to play audio sounds based upon audio signals comprising object based audio signals; and mixing at least two of the audio signals based, at least partially, upon the determined location(s).

Determining location may comprise tracking location of the at least one second device relative to a first device over time. Mixing of at least two of the audio signals may be based, at least partially, upon relative location(s) of the at least one second device location relative to a first device location. The method may further comprise coupling the devices by at least one a wireless link, where at least one audio track is shared by at least two of the devices. The method may further comprise coupling the devices by at least one a wireless link, and further comprising allocating audio tracks to the devices. Mixing of at least two of the audio signals may be adjusted based upon movement of the at least one second device relative to the first device. Mixing of at least two of the audio signals may be adjusted based upon relative movement of at least two of the second devices relative to each other. The method may further comprise playing the audio sounds on the devices, where the devices play respective audio sounds which are at least partially different, where each of the respective audio sounds are generated based upon a different one of the object based audio signals; and where mixing is done by the first device. The method may further comprise based upon relocation of the at least one second device relative to the first device, automatically adjusting the mixing by the first device of at least two audio signals based, at least partially, upon the new determined location(s). The method may further comprise using a user interface on the first device to adjust output of the audio sound from at least one of the second devices. The method may further comprise another first device:

determining location of at least one of the second device(s) relative to the another first device; and mixing at least two of the audio signals by the another first device based, at least partially, upon the determined location(s) of the at least one second device(s) relative to the another first device.

Another example embodiment may comprise a non-transitory program storage device readable by a machine, tangibly embodying a program of instructions executable by the machine for performing operations, the operations comprising determining location at least one second device relative to a first device, where at least two of the devices are configured to play respective audio sounds, where the respective audio sounds are at least partially different, where each of the respective audio sounds are generated based upon audio signals comprising at least one object based audio signal; and mixing the audio signals based, at least partially, upon location of the at least one second device relative to the first device.

Determining location may comprise tracking location of the at least one second device relative to a first device over time. Mixing of at least two of the audio signals may be based, at least partially, upon relative location(s) of the at least one second device relative to a first device.

One type of example embodiment may be provided in an apparatus comprising electronic components including a processor and a memory comprising software, where the electronic components are configured to mix audio signals based, at least partially, upon location of at least one device relative to the apparatus and/or at least one other device, where at least two of the apparatus and the at least one device are adapted to play respective audio sounds, where the respective audio sounds are based upon audio signals comprising object based audio signals, where the apparatus is configured to adjust mixing of the audio signals based upon location of the at least one device relative to the apparatus and/or the at least one other device.

The apparatus may be configured to track location of the at least one device relative to the apparatus over time. The apparatus may be configured to mix at least two of the audio signals is based, at least partially, upon relative location(s) of the at least one device relative to the apparatus. The apparatus may be configured to couple the at least one device and the apparatus by at least one a wireless link, where at least one audio track is shared. The apparatus may be configured to couple the at least one device and the apparatus by at least one a wireless link, and allocate audio tracks to the at least one device and the apparatus. The apparatus is configured to adjust mixing of the audio signals based upon movement of the at least one device relative to the apparatus.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method for creating a spatial audio mix of audio objects at a first electronic device based on locations of the first electronic device and at least one second electronic device, the method comprising:

assigning, by the first electronic device wirelessly connected to the at least one second electronic device via a short-range communications system, at least one of the audio objects to each of the first electronic device and the at least one second electronic device;

initiating, by the first electronic device, mixing of the assigned audio objects;

determining, by the first electronic device, a location of the at least one second electronic device relative to the first electronic device;

mixing, by the first electronic device, the assigned audio objects to create the spatial audio mix based on the determined relative location of the at least one second electronic device and the first electronic device, wherein the mixing comprises defining a spatial location of each of the audio objects based on the determined relative location of the at least one second electronic device and the first electronic device and at least one new determined relative location resulting from a movement of at least one of the first electronic device and the at least one second electronic device;

updating, by the first electronic device, the spatial location of each of the assigned audio objects in real time based upon the at least one new determined relative location while the mixing is being performed;

rendering, by the first electronic device, the spatial audio mix while the mixing is being performed; and in response to a user input to end the mixing, creating a file comprising the spatial audio mix.

2. The method as in claim 1 further comprising coupling the first electronic device and the at least one second electronic device by a short range wireless link of the short range communication system, and wherein at least one of the assigned audio objects is shared by the first electronic device and the at least one second electronic device.

3. The method as in claim 1 further comprising using a user interface on the first electronic device to adjust an output of the audio object assigned to the at least one second electronic device.

4. The method according to claim 1, wherein the mixing comprises synchronizing the first electronic device and the at least one second electronic device to start playback of the assigned audio objects when the mixing is initiated.

5. The method according to claim 1, wherein mixing the spatial audio mix comprises at least one of:

adjusting a sound level of at least one of the audio objects; and adding a sound effect to at least one of the audio objects.

6. The method according to claim 1, wherein the spatial audio mix comprises a nested spatial audio mix such that at least one of the assigned audio objects comprises a combined representation of a plurality of audio objects.

7. The method as in claim 1, wherein the first electronic device and the at least one second electronic device are mobile electronic devices.

8. A non-transitory program storage device readable by a machine, tangibly embodying a program of instructions executable by the machine for performing operations for creating a spatial audio mix of audio objects at a first electronic device based on locations of the first electronic device and at least one second electronic device, the operations comprising:

assigning, by the first electronic device wirelessly connected to the at least one second electronic device via a short-range communications system, at least one of the audio objects to each of the first electronic device and the at least one second electronic device;

initiating, by the first electronic device, mixing of the assigned audio objects;

determining, by the first electronic device, a location of the at least one second electronic device relative to the first electronic device;

mixing, by the first electronic device, the assigned audio objects to create the spatial audio mix based on the determined relative location of the at least one second electronic device and the first electronic device, wherein the mixing comprises defining a spatial location of each of the audio objects based on the determined relative location of the at least one second electronic device and the first electronic device and at least one new determined relative location resulting from a movement of at least one of the first electronic device and the at least one second electronic device;

updating, by the first electronic device, the spatial location of each of the assigned audio objects in real time based upon the at least one new determined relative location while the mixing is being performed;

rendering, by the first electronic device, the spatial audio mix while the mixing is being performed; and in response to a user input to end the mixing, creating a file comprising the spatial audio mix.

9. The non-transitory program storage device as in claim 8, wherein the operations further comprise:

coupling the electronic device and the at least one second electronic device by a short range wireless link of the short range communication system, and wherein at least one of the assigned audio objects is shared by the first electronic device and the at least one second electronic device.

10. The non-transitory program storage device as in claim 8, wherein the mixing comprises synchronizing the first electronic device and the at least one second electronic device to start playback of the assigned audio objects when the mixing is initiated.

11. The non-transitory program storage device as in claim 8, wherein mixing the spatial audio mix comprises at least one of:

adjusting a sound level of at least one of the audio objects; and adding a sound effect to at least one of the audio objects.

12. The non-transitory program storage device as in claim 8, wherein the spatial audio mix comprises a nested spatial audio mix such that at least one of the assigned audio objects comprises a combined representation of a plurality of audio objects.

13. The non-transitory program storage device as in claim 8, wherein the first electronic device and the at least one second electronic device are mobile electronic devices.

14. An electronic device for creating a spatial audio mix of audio objects at the electronic device based on locations of the electronic device and at least one other electronic device, wherein the electronic device is wirelessly connected to the at least one other electronic device via a short-range communications system, the electronic device comprising:

at least one processor, and at least one non-transitory memory comprising computer program code, the at least one memory and the computer program code configured to, with the at least one processor, cause the electronic device at least to:

assign at least one of the audio objects to each of the electronic device and the at least one other electronic device;

initiate mixing of the assigned audio objects;

determine a location of the at least one other electronic device relative to the electronic device;

mix the assigned audio objects to create the spatial audio mix based on the determined relative locations of the at least one other electronic device and the electronic device, wherein the mix comprises definition of a spatial location of each of the audio objects based on the determined relative location of the at least one other electronic device and the electronic device and at least one new determined relative location resulting from a movement of at least one of the electronic device and the at least other electronic device;

update the spatial location of each of the assigned audio objects in real time based upon the at least one new determined relative location while the mixing is being performed;

render the spatial audio mix while the mixing is being performed; and in response to a user input to end the mixing, creating a file comprising the spatial audio mix.

15. The electronic device as in claim 14 where the electronic device is configured to couple the electronic device and the at least one other electronic device by the short-range communication system, and wherein at least one of the assigned audio objects is shared by the at least one other electronic device and the electronic device.

16. The electronic device as in claim 14 where the electronic device is configured to mix the assigned audio objects based upon at least one of:

a movement of the at least one other electronic device relative to the electronic device; and a relative movement of the electronic device and the at least one other electronic device relative to each other.

17. The electronic device as in claim 14, wherein the electronic device and the at least one other electronic device are mobile electronic devices.

* * * * *